United States Patent
Saito et al.

(10) Patent No.: US 7,559,502 B2
(45) Date of Patent: Jul. 14, 2009

(54) MOTOR RETRACTOR

(75) Inventors: Takuhiro Saito, Aichi-ken (JP); Seiji Ikeda, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 207 days.

(21) Appl. No.: 11/674,006

(22) Filed: Feb. 12, 2007

(65) Prior Publication Data

US 2007/0187541 A1 Aug. 16, 2007

(30) Foreign Application Priority Data

Feb. 14, 2006 (JP) ............................. 2006-037125

(51) Int. Cl.
*B65H 75/48* (2006.01)

(52) U.S. Cl. .................................. 242/390.8; 242/390.9

(58) Field of Classification Search ................. 242/374, 242/390, 390.8, 390.9; 280/807

See application file for complete search history.

(56) References Cited

U.S. PATENT DOCUMENTS 4,741,556 A * 5/1988 Nagashima ................. 280/807

| 2005/0083000 | A1 | 4/2005 | Specht et al. |
| 2006/0022079 | A1 | 2/2006 | Koide et al. |
| 2007/0051841 | A1* | 3/2007 | Mori .......................... 242/374 |
| 2008/0231036 | A1* | 9/2008 | Takao et al. ................. 280/807 |

FOREIGN PATENT DOCUMENTS

EP 1 518 766 A1 3/2005
JP 2004-244011 A 9/2004

OTHER PUBLICATIONS

European Search Report dated May 15, 2007 from corresponding European Patent Application No. EP 07 00 3032.

* cited by examiner

*Primary Examiner*—Sang Kim
(74) *Attorney, Agent, or Firm*—Roberts Mlotkowski Safran & Cole, P.C.; Thomas W. Cole

(57) ABSTRACT

A motor retractor, comprising: a winding shaft which winds up a webbing for restraining a vehicle passenger; a motor which rotates the winding shaft in a webbing winding-up direction; and a control portion which, after release of the webbing wearing state of the passenger: drives the motor to cause the webbing to be wound up around the winding shaft; stops the motor when an overload on the motor is detected during the winding-up; redrives the motor after a predetermined time having elapsed after the motor is stopped due to detection of the overland, and adjusts, at the time of the redriving, a driving state of the motor according to the time of driving the motor that has elapsed before the overload detection, is provided.

6 Claims, 3 Drawing Sheets

MOTOR RETRACTOR

CROSS-REFERENCE TO RELATED APPLICATION

This application claims priority under 35 USC 119 from Japanese Patent Application No. 2006-037125, the disclosure of which is incorporated by reference herein.

BACKGROUND

1. Technical Field

The present invention pertains to a webbing winding apparatus, and particularly relates to a motor retractor which can wind up a webbing by rotating a winding shaft with a motor.

2. Related Art

A conventional motor retractor is structured so as to interrupt power feeding to the motor when a passenger's arm, or the like, catches the webbing during winding resulting in the motor being overloaded (referring to Japanese Patent Application Laid-Open No. 2004-244011). With this motor retractor, the power feeding to the motor is resumed after the lapse of a predetermined time following the interruption of the power feeding to the motor, and thus, the passenger can release their arm, or the like, from the webbing within the above-mentioned predetermined time, and with the power feeding to the motor being resumed, winding-up of the webbing can be completed.

However, with such a motor retractor, if winding-up the webbing is resumed in a state in which the passenger has not released their arm, or the like, from the webbing, a sense of discomfort may be given to the passenger. Particularly, in a state in which most of the webbing has been wound up, the passenger's arm, or the like, will be easily pulled by the webbing, which can increase the sense of discomfort given to the passenger.

SUMMARY

The present invention has been made in view of the above-mentioned situation, and the purpose thereof is to provide a motor retractor which, even when winding-up of the webbing is resumed in a state in which an arm, or the like, has not been released from being caught by the webbing, the sense of discomfort given to a passenger can be reduced.

The motor retractor of a first aspect of the present invention provides a motor retractor, comprising: a winding shaft which winds up a webbing for restraining a vehicle passenger; a motor which rotates the winding shaft in a webbing winding-up direction; and a control portion which, after release of the webbing wearing state of the passenger: drives the motor to cause the webbing to be wound up around the winding shaft; stops the motor when an overload on the motor is detected during the winding-up; redrives the motor after a predetermined time having elapsed after the motor is stopped due to detection of the overland, and adjusts, at the time of the redriving, a driving state of the motor according to the time of driving the motor that has elapsed before the overload detection.

In the motor retractor of the first aspect, when, in a state in which the webbing is being wound up around the winding shaft by the driving of the motor, the passenger's arm, or the like, for example, gets caught by the webbing, resulting in the motor being overloaded, the control portion detects the overload of the motor, and stops the motor, and redrives the motor after a predetermined time has elapsed.

Herein, with this motor retractor, when the control portion redrives the motor as described above, the control portion adjusts the driving state of the motor according to the driving time of the motor that has elapsed before the above-mentioned overload is detected. That is, the above-mentioned driving time of the motor corresponds to the amount of the webbing wound up on the winding shaft at the time of the above-mentioned overload detection, and thus, even when the passenger has not released their arm, or the like, from the webbing 28 within the above-mentioned predetermined time, the control portion adjusts the driving state of the motor (that is, the driving force, the rotation speed, the driving time, and the like) at the time of the redrive according to the above-mentioned driving time of the motor, whereby the sense of discomfort given to the passenger can be reduced. The overload on the motor can be detected by, for example, detecting that the supply current to the motor has increased beyond a predetermined threshold value.

The motor retractor of a second aspect of the present invention provides the motor retractor of the first aspect, wherein said control portion adjusts the driving state of the motor by changing the magnitude of a voltage applied to the motor In the motor retractor of the second aspect, the control portion controls the motor with voltage, and thus even when, for example, the motor is driven in a state in which the engine of the vehicle is stopped, resulting in the power supply voltage becoming unstable, the rotation speed of the motor, that is, the speed of winding-up the webbing, can be kept constant without being influenced by fluctuations of the power supply voltage.

The motor retractor of a third aspect of the present invention provides the motor retractor of the first aspect or the second aspect, wherein, when the time of driving the motor that has elapsed before the overload detection is equal to or longer than a preset time, the control portion lowers the magnitude of a supply current to the motor at the time of the redriving.

With the motor retractor of the third aspect, when the driving time of the motor that has elapsed before the overload detection is equal to or longer than the preset time, that is, when, for example, most of the webbing has been wound up on the winding shaft, the magnitude of the supply current to the motor at the time of the redrive of the motor is lowered. Thereby, the winding force and the winding-up speed of the webbing are lowered, and thus even when the motor is redriven in a state in which the passenger has not released their arm, or the like, from the webbing, the sense of discomfort given to the passenger can be reduced.

The motor retractor of a fourth aspect of the present invention provides the motor retractor of any one of the first aspect to the third aspect, wherein, when the time of driving the motor that has elapsed before the overload detection is equal to or longer than a preset time, the control portion shortens a time of driving the motor at the time of the redriving.

With the motor retractor of the fourth aspect, when the driving time of the motor that has elapsed before the overload detection is equal to or longer than the preset time, that is, when, for example, the amount of webbing to be wound up has become smaller, the driving time of the motor at the time of redriving the motor is shortened, and thus unnecessary driving of the motor after the winding-up of the webbing is completed, can be prevented, and accordingly the occurrence of noise due to the unnecessary driving, can be suppressed.

The motor retractor of a fifth aspect of the present invention provides the motor retractor of any one of the first aspect to the fourth aspect, wherein, when a preset time has elapsed after the motor is driven for the first time following the release of the webbing wearing state, the control portion lowers the magnitude of a supply current to the motor.

With the motor retractor of the fifth aspect, when the preset time has elapsed after the motor has been driven for the first time following the release of the webbing wearing state of the passenger, that is, when, for example, in a state in which most of the webbing has been wound up, and it becomes difficult for the passenger to release their arm, or the like, from the webbing, the magnitude of the supply current to the motor is lowered. Thereby, the webbing winding-up force and winding-up speed are lowered, and thus the passenger can release their arm, or the like, from the webbing easily.

The motor retractor of a sixth aspect of the present invention provides a motor retractor, comprising: a winding shaft which winds up a webbing for restraining a vehicle passenger; a motor which rotates the winding shaft in a webbing winding-up direction; and a control portion which, after release of a webbing wearing state of the passenger: feeds power to the motor to cause the webbing to be wound up around the winding shaft; interrupts the power feeding to the motor when an overload on the motor is detected during the winding; and gradually increases the magnitude of a current to resume the power feeding to the motor after the interruption of power feeding to the motor.

With the motor retractor of the sixth aspect, when, in a state in which the webbing is being wound up around the winding shaft by the power feeding to the motor, the passenger's arm, or the like, for example, gets caught by the webbing, resulting in the motor overload, the control portion detects the motor overload, interrupts the power feeding to the motor, and resumes the power feeding to the motor after a predetermined time has elapsed.

Herein, in this motor retractor, when the control portion resumes the power feeding to the motor as described above, the control portion gradually increases the magnitude of the current to resume the power feeding to the motor. Therefore, even when, during the time the power feeding to the motor has been interrupted, resulting in the motor being stopped, the passenger has not released their arm, or the like, from the webbing, the rush current flowing to the motor at the time of the resumption of the power feeding can be reduced, and thus the rush current can be prevented from causing the motor to be rapidly driven, resulting in a sense of discomfort given to the passenger. The motor overload can be detected by, for example, detecting that the supply current to the motor has increased beyond a predetermined threshold value.

The motor retractor of a seventh aspect of the present invention provides the motor retractor of the sixth aspect, wherein the control portion decreases the magnitude of a stationary current for the motor after the resumption of the power feeding to a value that is smaller than the magnitude of the stationary current for the motor before the overload detection.

With the motor retractor of the seventh aspect, because the magnitude of the stationary current for the motor after the resumption of the power feeding is decreased to a value smaller than the magnitude of the stationary current for the motor before the overload detection, the driving force and the rotation speed of the motor, that is, the winding-up force and the winding-up speed for the webbing are also decreased. Therefore, the sense of discomfort given to the passenger can be further reduced.

As described above, with the motor retractor according to the present invention, even when the winding-up of the webbing is resumed in a state in which a passenger' arm, or the like, has not been released, the sense of discomfort given to the passenger can be reduced.

DETAILED DESCRIPTION

First Embodiment

Figure 1:
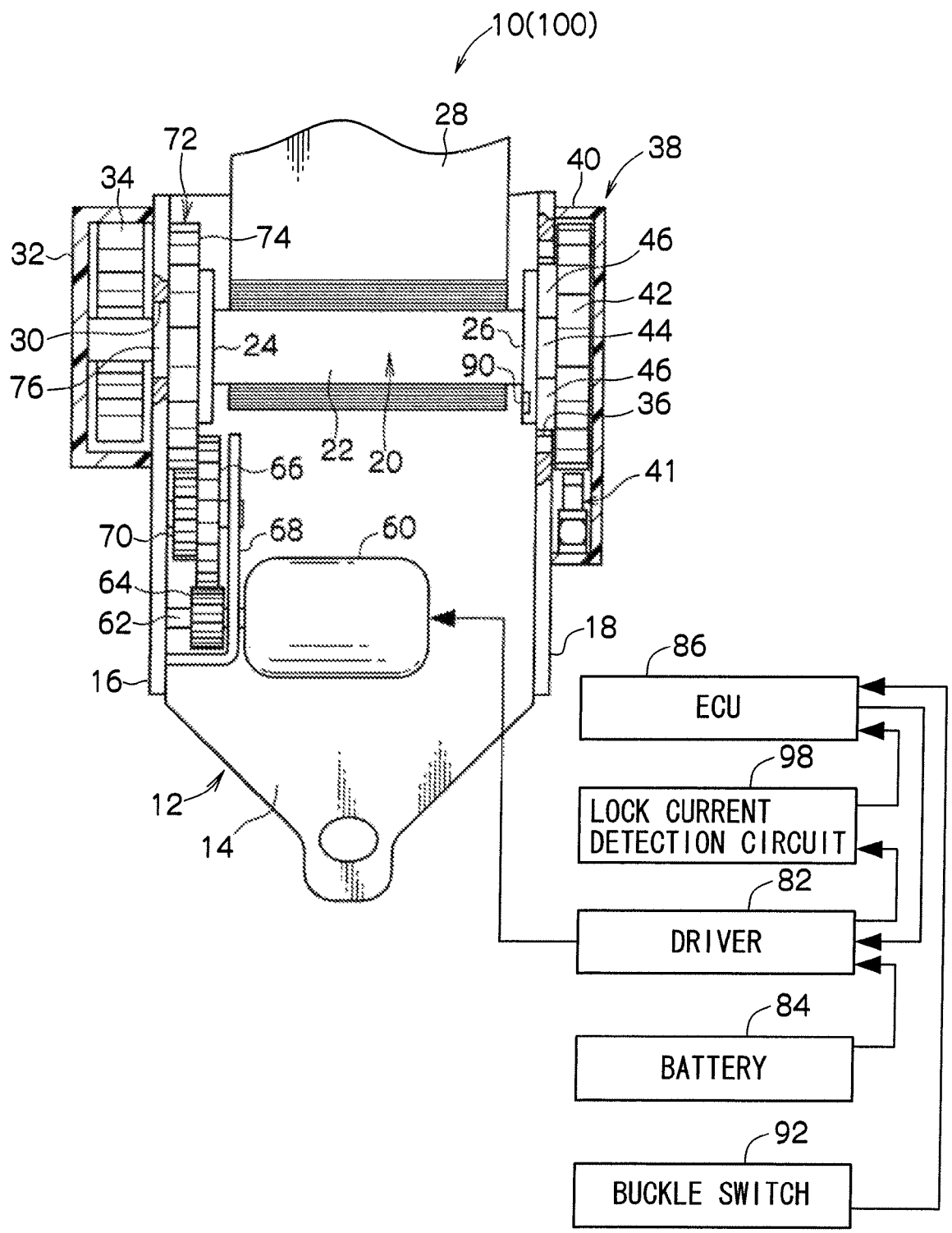
FIG. 1 is a front sectional view schematically illustrating the overall configuration of a motor retractor according to a first embodiment of the present invention.

FIG. 1 is a front sectional view illustrating the overall configuration of a motor retractor 10 according to a first embodiment of the present invention.

As shown in FIG. 1, the motor retractor 10 comprises a frame 12. The frame 12 comprises a substantially plate-like back plate 14, and by fixing this back plate 14 to a vehicle body by means of a connecting part (not shown), such as a bolt, or the like, the present motor retractor 10 is mounted to the vehicle body. From both ends of the back plate 14 in a width direction, a pair of foot plates 16, 18 are extended in parallel with each other, and between these foot plates 16, 18, a spool 20, serving as a winding shaft and manufactured by die casting or the like, is rotatably disposed.

The spool 20 is made up of a substantially cylindrical spool main body 22, and a pair of flange portions 24, 26 formed substantially in the shape of a disk at both ends of this spool main body 22, and as a whole, has the shape of a drum.

To the spool main body 22, the base end portion of a webbing 28 formed in the shape of a long strip is connected and fixed, and when the spool 20 is rotated in one direction around the axis thereof (hereinafter, this direction is called the "winding-up direction"), the webbing 28 is wound up from the base end side thereof around the circumference of the spool main body 22 in layers. On the other hand, when the webbing 28 is taken out from the tip end thereof, the spool 20 is rotated while the webbing 28 is taken out (hereinafter, the direction of rotation of the spool 20 when the webbing 28 is taken out is called the "taking-out direction").

On the side of the flange part 24 that is opposite to the flange part 26, one end side of the spool 20 penetrates substantially coaxially into a round hole 30 formed in the foot plate 16 to protrude to the outside of the frame 12. On the outside of the frame 12 at the foot plate 16 side, a casing 32 is disposed. The casing 32 is disposed along the axial direction of the spool 20, facing the foot plate 16, and fixed to the foot plate 16. In addition, the casing 32 is opened as a whole toward the foot plate 16 side, and the one end side of the spool 20 penetrating into the round hole 30 enters into the casing 32, and is rotatably pivotally-supported by the casing 32.

Further, inside of the casing 32, a spiral spring 34 is disposed. The outside end in the spiral direction of the spiral spring 34 is engaged at the casing 32, while the inside end in the spiral direction of the spiral spring 34 is engaged at the spool 20. This spiral spring 34 biases the spool 20 in the winding-up direction.

The biasing force of this spiral spring 34 (the winding-up force of the webbing 28 based on that biasing force) is set relatively weakly, and to such a degree that looseness of the webbing 28 worn by a passenger is eliminated. In other words, the biasing force of the spiral spring 34 is set at a strength that will not give an oppressive feeling to a passenger when the webbing 28 is worn, not being required to be of a strength that causes the webbing 28 taken out from the spool 20 to be wound up to the last against the friction force or the like.

Further, the spool 20 comprises a pivot portion (not shown) protruding coaxially from the end portion on the flange part 26 side. This pivot portion substantially coaxially penetrates into an internally toothed ratchet hole 36 formed in the foot plate 18 to protrude to the outside of the frame 12, and is rotatably pivotally-supported by a substantially cup-like casing 40 that is fixed with the opening end being butted against the outside surface of the foot plate 18 and constitutes a lock mechanism 38.

The lock mechanism 38 normally tolerates free rotation of the spool 20 in both of the winding-up direction and the taking-out direction, and, and prevents the rotation of the spool 20 in the taking-out direction at the time of vehicle rapid deceleration. In the present first embodiment, when an acceleration sensor 41 prevents a ratchet gear 42 from rotating in the taking-out direction, the relative rotation between the ratchet gear 42 and the spool 20 causes a lock plate 46 to protrude from a lock base 44 and engage with the internal teeth of the ratchet hole 36 in the foot plate 18, resulting in the rotation of the spool 20 in the taking-out direction being prevented. Between the lock base 44 and the spool 20, a torsion bar may be connected to provide a configuration in which, after the above-mentioned locking, the torsion bar is twisted while the rotation of the spool 20 in the taking-out direction is allowed to achieve energy absorption (achieve a force limiter function).

Further, a motor 60 is disposed between the foot plate 16 and the foot plate 18 under the spool 20. The motor 60 has an output shaft 62, on which a gear 64 is coaxially and integrally provided.

Above the gear 64 in the radial direction, a gear 66 having a diameter larger than that of the gear 64 is disposed. The gear 66 is engaged with the gear 64, in a state in which the gear 66 is rotatably pivotally-supported by a support plate 68 provided between the foot plates 16, 18 and the foot plate 16 around an axis parallel with the axis of the spool 20. In addition, at a lateral side of the gear 66 in the axial direction, a gear 70 having a diameter smaller than that of the gear 66 is coaxially and integrally provided with respect to the gear 66.

Further, above the gear 70 in the radial direction, a clutch 72 is provided. The clutch 72 comprises an externally toothed gear 74 formed in the shape of a ring. The gear 74 is provided coaxially and relatively rotatably with respect to the spool 20 in a state in which it is engaged with the gear 70, and both ends thereof in the axial direction are blocked with disk-like members (not shown). In addition, inside of the gear 74, an adapter 76 in the shape of a cylinder is provided coaxially with respect to the spool 20. The adapter 76 is connected integrally with the spool 20, penetrating into the disk-like members that block both ends of the gear 74, to rotatably pivotally-support the disk-like members, and thus the gear 74, around the spool 20.

Inside of the gear 74, a connecting member (not shown), such as a pawl which is rocked by the centrifugal force, or the like, is accommodated. This connecting member is supported, for example, by the above-mentioned disk-like members, and rotates integrally with the gear 74.

Herein, with the clutch 72, the rotating force of the output shaft 62 of the motor 60 is transmitted to the gear 74 via the gear 64, the gear 66, and the gear 70 (the output shaft 62 and the gear 74 always rotate in synchronism with each other), and when the output shaft 62 of the motor 60 rotates in the forward direction, the gear 74 rotates in the winding-up direction. When the gear 74 rotates in the winding-up direction, the connecting member is mechanically connected to the circumferential surface of the adapter 76, resulting in the gear 74 and the adapter 76 being integrally connected to each other. Thereby, the rotation of the gear 74 in the winding-up direction (the forward running of the motor 60) is transmitted to the spool 20 via the adapter 76.

On the other hand, when the output shaft 62 of the motor 60 rotates in the reverse direction, the gear 74 rotates in the taking-out direction. In this case, when the gear 74 relatively rotates in the taking-out direction by a predetermined amount with respect to the adapter 76 (when the reverse running of the motor 60 causes the output shaft 62 to relatively rotate with respect to the spool 20 by a predetermined amount), the mechanical connection of the connecting member to the adapter 76 is released, and the clutch 72 is brought into a disengaged state.

In addition, on the other hand, the present motor retractor 10 comprises a driver 82 and an ECU 86 constituting a control portion. A driving control program according to the first embodiment of the present invention is stored in the ECU 86. In addition, the motor 60 is electrically connected to a battery 84 loaded on a vehicle via the driver 82, and with the current from the battery 84 flowing to the motor 60 via the driver 82, the motor 60 exerts a driving force to rotate the output shaft 62 in the forward or reverse direction. The driver 82 is connected to the ECU 86, and whether power is to be fed to the motor 60 via the driver 82, and the direction and magnitude of the supply current are controlled by the ECU 86.

Further, a buckle switch 92 serving as the control portion for detecting whether or not a tongue plate provided at the webbing 28 is connected to the buckling apparatus (both not shown) is connected to the ECU 86. When the tongue plate is connected to the buckling apparatus, the buckle switch 92 outputs, to the ECU 86, a signal at an H level indicating that the switch is in the ON state, and, when the tongue plate is disconnected from the buckling apparatus, the buckle switch 92 outputs, to the ECU 86, a signal at an L level indicating that the switch is in the OFF state. When the signal outputted from the buckle switch 92 is a signal at an L level, the ECU 86 determines that the webbing 28 is stored in the retractor.

In addition, a lock current detection circuit 98 that is a component of the control portion is connected to the ECU 86. This lock current detection circuit 98 is connected to the motor 60 via the driver 82, and when an external force resisting the rotation of the output shaft 62 acts, resulting in the motor 60 being overloaded, and the magnitude of the current flowing to the motor 60 (the driver 82) is increased beyond a previously set threshold value IL (when a so-called lock current flows to the motor 60), the lock current detection circuit 98 outputs a predetermined electric signal (hereinafter, this signal is referred to as the "lock detection signal") to the ECU 86.

FIG. 2A to FIG. 2D are timing charts illustrating the relationship between the current to be supplied to the motor 60 by the ECU 86 and the driver 82 when the motor retractor 10 is to store the webbing 28, and time.

In the motor retractor 10, the ECU 86 and driver 82 start to supply a current having a predetermined current value I0 to the motor 60 for rotating the motor 60 in the forward direction at the time point (a time point of T0 in FIG. 2A) when it is detected that the tongue plate provided at the webbing 28 has been disconnected from the buckling apparatus (the passenger having released the wearing state of the webbing 28). In this case, on the basis of the adequate storing speed (the adequate winding-up speed) for the webbing 28, the magnitude of the current value I0 is set such that the magnitude of the current value I0 is smaller than the threshold value IL of the lock current set for the lock current detection circuit 98 (such that I0<IL).

Figure 2A:
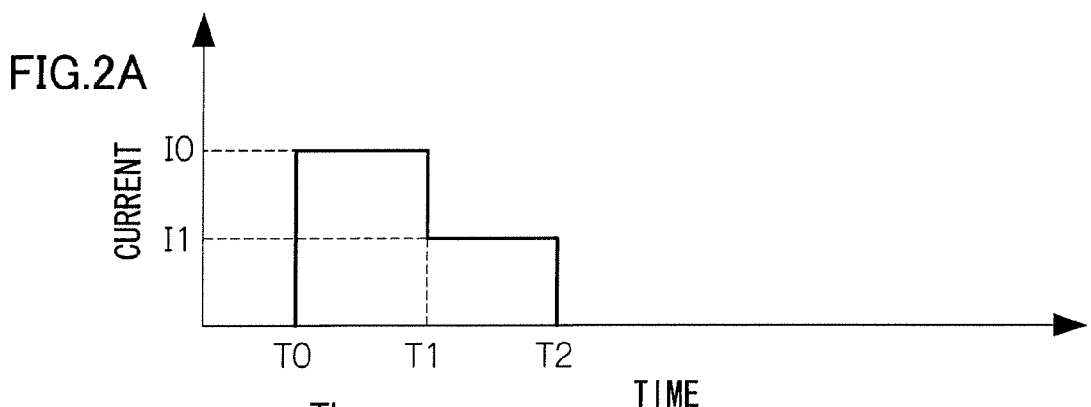
FIG. 2A is a timing chart illustrating the relationship between a current to be supplied to a motor by a control portion of a motor retractor according to the first embodiment of the present invention, and time.

Further, at the time point when the time previously set for the ECU 86 has elapsed (a time point of T1 in FIG. 2A), the ECU 86 determines that the amount of winding-up of the webbing 28 on to the spool 20 has reached the previously set amount (for example, about half), and as shown in FIG. 2A, outputs, to the driver 82, a signal for lowering the magnitude of the supply current to the motor 60 from the current value I0 to a current value I1. Further, at the time point when a predetermined time has elapsed from this lowering of the current value (a time point of T2 in FIG. 2A), the ECU 86 determines that the webbing 28 has been fully stored on the present motor retractor 10 and outputs, to the driver 82, a signal for interrupting the power feeding to the motor 60. In addition, in the motor retractor 10, when a predetermined time has elapsed after the power feeding to the motor 60 has been interrupted at the time point of T2, the ECU 86 and the driver 82 perform the power feeding control as shown in FIG. 2A (hereinafter, to be called the "full operation control") several times before terminating the control of power feeding to the motor 60.

On the other hand, when an overload on the motor 60 is detected during the winding-up of the webbing 28, that is, when a lock detection signal is outputted from the lock current detection circuit 98 to the ECU 86, the ECU 86 outputs, to the driver 82, a signal for interrupting the power feeding to the motor 60, and further, after a predetermined time has elapsed, outputs, to the driver 82, a signal for redriving the motor 60.

Furthermore, at the time of the redriving, the ECU 86 and the driver 82 detect the amount of winding-up of the webbing 28 onto the spool 20 at the time of the above-mentioned overload detection on the basis of the time for driving the motor 60 that has elapsed before the lock detection signal is inputted, that is, the time TL from the time point when the driving of the motor 60 has been started (the time point of T0) to the time point when the lock detection signal is inputted (hereinafter, referred to as the "lock detection time TL"), and adjust the driving state of the motor 60 according to the length of this lock detection time TL.

Figure 2B:
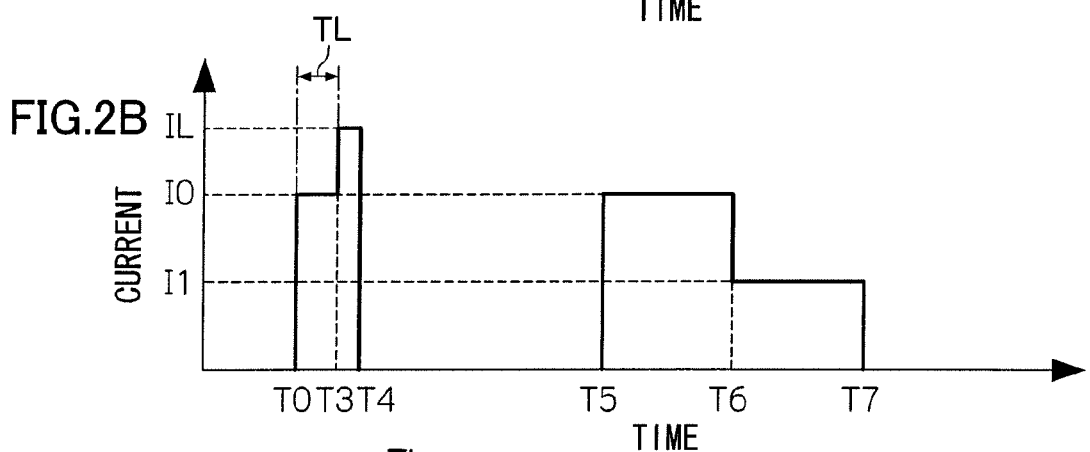
FIG. 2B is a timing chart illustrating the relationship between the current to be supplied to the motor by the control portion of the motor retractor according to the first embodiment of the present invention, and time.

That is, when a lock current detection signal is inputted to the ECU 86 at a certain time point in an early stage of winding-up of the webbing 28 (at a time point of T3 in FIG. 2B, for example, in a case where the lock detection time TL is short), the ECU 86 outputs, to the driver 82, a signal for interrupting the power feeding to the motor 60, and thereby the power feeding to the motor 60 is interrupted at a time point of T4 in FIG. 2B. In this case, the ECU 86 determines that the amount of winding-up of the webbing 28 onto the spool 20 is small, that is, the webbing 28 has hardly been stored on the retractor, and after a predetermined time has elapsed (at a time point of T5 in FIG. 2B), starts the above-mentioned "full operation control". That is, the ECU 86 and the driver 82 start to supply the current having a current value of I0 to the motor 60 at the time point of T5 in FIG. 2B; lower the magnitude of the supply current to the motor 60 from the current value I0 to the current value I1 at a time point of T6 in FIG. 2B; and interrupt the power feeding to the motor 60 at a time point of T7 in FIG. 2B.

On the other hand, when a lock current detection signal is inputted to the ECU 86 at a certain time point in a later stage of winding-up of the webbing 28 (at a time point of T8 in FIG. 2C, for example, in a case where the lock detection time TL is long), the ECU 86 outputs, to the driver 82, a signal for interrupting the power feeding to the motor 60, and thereby the power feeding to the motor 60 is interrupted at a time point of T9 in FIG. 2B. In this case, the ECU 86 determines that the amount of winding-up of the webbing 28 on the spool 20 is large, that is, that most of the webbing 28 has been stored in the retractor, and after a predetermined time has elapsed (at a time point of T10 in FIG. 2C), outputs, to the driver 82, a signal for supplying a current having a current value of I2 to the motor 60, thereby driving the motor 60 at a low output. In the present first embodiment, the magnitude of the current value I2 is set smaller than the current value I0 (I2<I0), and the motor 60 is driven in a mode which is the weakest next to the stopped state.

Figure 2C:
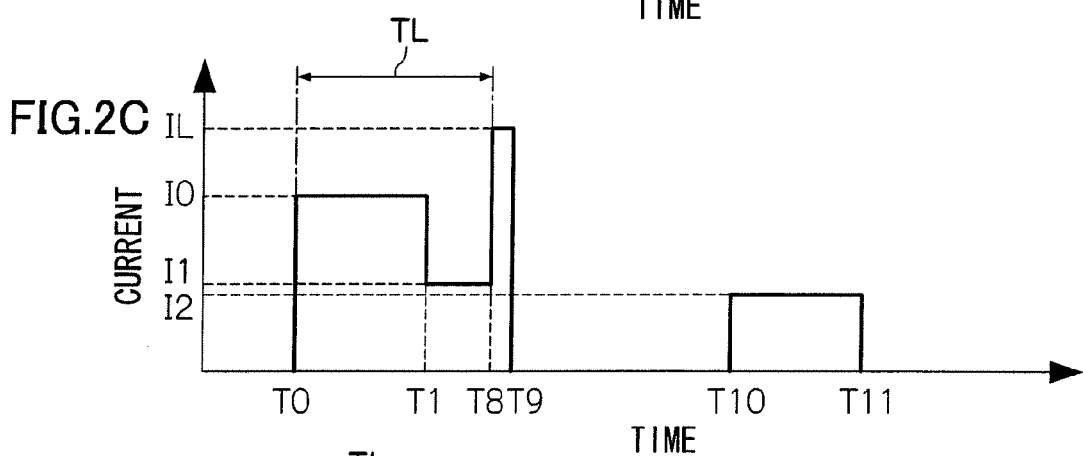
FIG. 2C is a timing chart illustrating the relationship between the current to be supplied to the motor by the control portion of the motor retractor according to the first embodiment of the present invention and the time.

Furthermore, at a time point of T11 in FIG. 2C, the ECU 86 outputs, to the driver 82, a signal for interrupting the power feeding to the motor 60, and thereby the motor 60 is stopped. The time for power feeding to the motor 60 (from T10 to T11) at this time is shorter than the time for power feeding to the motor 60 in the "full operation control" (from T0 to T2 or from T5 to T7), and the motor 60 is driven for a shorter time.

Figure 2D:
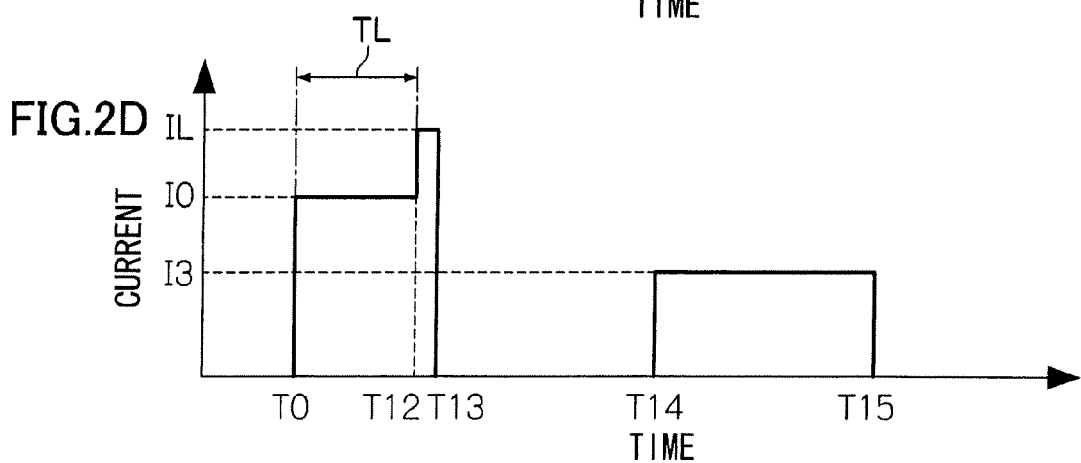
FIG. 2D is a timing chart illustrating the relationship between the current to be supplied to the motor by the control portion of the motor retractor according to the first embodiment of the present invention, and time.

In addition, when a lock current detection signal is inputted to the ECU 86 at a certain time point in a middle stage of winding-up of the webbing 28 (at a time point of T12 in FIG. 2D, for example, in a case where the lock detection time TL is of a medium length), the ECU 86 outputs, to the driver 82, a signal for interrupting the power feeding to the motor 60, and thereby the power feeding to the motor 60 is interrupted at a time point of T13 in FIG. 2D. In this case, the ECU 86 determines that the amount of winding-up of the webbing 28 onto the spool 20 is approx. half of that to be obtained at the time of full storage on the retractor, and after a predetermined time has elapsed (at a time point of T14 in FIG. 2D), outputs, to the driver 82, a signal for supplying a current having a current value of I3 to the motor 60, and thereby driving the motor 60 being driven at a low output. In the present first embodiment, the magnitude of the current value I3 is set at a value equal to or greater than the current value I2 and smaller than the current value I0 (I2<I3<I0).

Further, at a time point of T15 in FIG. 2D, the ECU 86 outputs, to the driver 82, a signal for interrupting the power feeding to the motor 60, thereby stopping the motor 60. In this case, the time for power feeding to the motor 60 (from T14 to T15) is shorter than the time for power feeding to the motor 60 in the "full operation control" (from T0 to T2 or from T5 to T7), and longer than the time for power feeding to the motor 60 when the motor has been overloaded in a later stage of winding-up of the webbing 28 (from T10 to T11). Therefore, the motor 60 is driven for a time shorter than that in the "full operation control" and longer than that in a case where the motor 60 has been overloaded in a later stage of winding-up of the webbing 28.

Next, the function of the present first embodiment will be described.

With the motor retractor 10 as configured above, when the passenger takes out the webbing 28 stored in the present motor retractor 10 to connect the tongue plate (not shown) provided at the webbing 28 to the buckling apparatus, a state in which the passenger wears the webbing 28 is achieved. In this wearing state, the webbing 28 restrains the passenger relatively weakly by the biasing force of the spiral spring 34.

On the other hand, when the passenger releases the connection state between the tongue plate and the buckling apparatus to release the wearing state of the webbing 28, the motor 60 is driven, and the winding-up of the webbing 28 is started. Then, when the webbing 28 is wound up to approx. half of the amount of winding-up at the time of full storage on the retractor, the driving force and the rotation speed of the motor 60 are lowered. Thereby, the webbing 28 is slowly wound up with a small force. Then, when a predetermined time (the time necessary for fully storing the webbing 28 on the retractor with the "full operation control") has elapsed from the start of winding-up of the webbing 28, the motor 60 is stopped.

On the other hand, when, in the early stage of winding-up the webbing 28, the passenger's arm, or the like, gets caught by the webbing 28, resulting in the motor 60 being overloaded, the motor 60 is stopped, and the winding-up of the webbing 28 is interrupted. Then, when a predetermined time (the time necessary for the passenger to release their arm, or the like, from the webbing 28) has elapsed, the motor 60 is redriven. In this case, because the webbing 28 has hardly been stored on the retractor 10, the motor 60 is driven with the "full operation control"; however, even in a case where the passenger has not released their arm, or the like, from the webbing 28 within the above-mentioned predetermined time, the sense of discomfort given to the passenger is minimal, because the amount of taking-out of the webbing 28 is large. In addition, even after the motor 60 has been redriven, the passenger will have enough time for releasing their arm, or the like.

In addition, when, in the later stage of winding-up of the webbing 28, the passenger's arm, or the like, gets caught by the webbing 28, resulting in the motor 60 being overloaded, the motor 60 is stopped, and the winding-up of the webbing 28 is interrupted. Then, when a predetermined time (the time necessary for the passenger to release their arm, or the like, from the webbing 28) has elapsed, the motor 60 is redriven. In this case, because most of the webbing 28 has been stored on the retractor, the motor 60 is driven at a low output for a short time. Therefore, even in case where the passenger has not released their arm, or the like, from the webbing 28, within the above-mentioned predetermined time, the sense of discomfort given to the passenger by the motor 60 being redriven can be reduced. In addition, because the time for driving the motor 60 is short, unnecessary driving of the motor 60 after completion of the winding-up of the webbing 28 can be prevented, and thus the occurrence of noise due to the unnecessary driving of the motor 60 can be suppressed.

In addition, when, in the middle stage of winding-up of the webbing 28, the passenger arm, or the like, gets caught by the webbing 28, resulting in the motor 60 being overloaded, the motor 60 is stopped, and the winding-up of the webbing 28 is interrupted. Then, when a predetermined time (the time necessary for the passenger to release their arm, or the like, from the webbing 28) has elapsed, the motor 60 is redriven. In this case, because approx. half of the webbing 28 has been stored on the retractor, the motor 60 is driven at a low output for a predetermined time, that is, for a time shorter than that in the "full operation control", and longer than that in a case where the motor 60 has been overloaded in the later stage of winding-up of the webbing 28. Therefore, the sense of discomfort given to the passenger at the time of the motor 60 being redriven can be reduced, and the occurrence of noise after the completion of the winding-up of the webbing 28 can be suppressed.

As described above, with the motor retractor 10 according to the first embodiment of the present invention, even when the winding-up of the webbing 28 is resumed in a state in which the catching thereof by an arm, or the like, has not been released, the sense of discomfort given to a passenger can be reduced.

Furthermore, in the motor retractor 10 according to the first embodiment of the present invention, the ECU 86 detects whether the amount of winding-up of the webbing 28 onto the spool 20 has reached a previously set amount, on the basis of the lock detection time TL (the time from the start of winding-up of the webbing 28 to the detection of the locking of the motor 60), and thus the configuration of the motor retractor 10 is simple. Means for detecting the amount of winding-up the webbing 28 (such as a sensor for detecting the amount of rotation of the spool 20, or the like) may be separately provided.

In addition, the above-mentioned first embodiment has been provided with a configuration in which, by changing the magnitude of the supply current to the motor 60, the driving state of the motor 60 is adjusted; however, besides this configuration, the first embodiment may be adapted to have a configuration in which, by changing the magnitude of the voltage to be applied to the motor 60, the driving state of the motor 60 is adjusted. In a case where a configuration in which the motor 60 is controlled with the voltage is provided, even when, for example, the motor 60 is driven in a state in which the engine of the vehicle is stopped, resulting in the power supply voltage becoming unstable, the rotation speed of the motor 60, that is, the speed of winding-up the webbing 28 can be kept constant without being influenced by fluctuations in the power supply voltage.

Second Embodiment

Next, a second embodiment of the present invention will be described. For configurations and functions that are essentially the same as those of the first embodiment, the same reference numerals as those in the first embodiment are provided, and description thereof is omitted.

FIG. 1 is a front sectional view illustrating the overall configuration of a motor retractor 100 according to a second embodiment of the present invention.

This motor retractor 100 is provided with basically the same configuration as that of the motor retractor 10 according to the first embodiment; however, a driving control program which is different from the driving control program according to the first embodiment is stored in the ECU 86.

Figure 3:
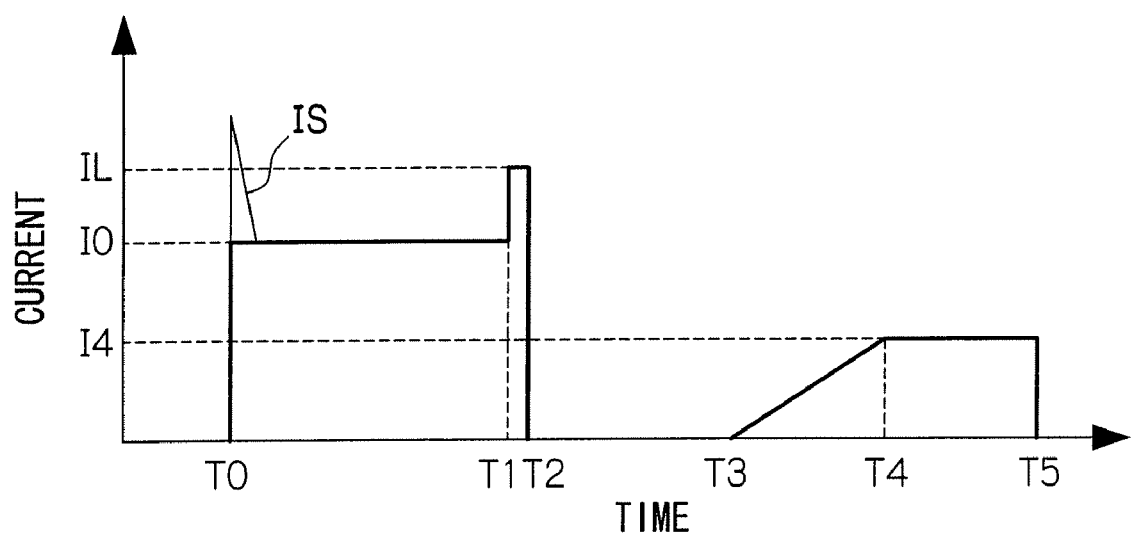
FIG. 3 is a timing chart illustrating the relationship between the current to be supplied to the motor by the control portion of a motor retractor according to a second embodiment of the present invention, and time.

FIG. 3 is a timing chart illustrating the relationship between the current to be supplied to the motor 60 by the ECU 86 and the driver 82 when the motor retractor 100 according to the second embodiment of the present invention stores the webbing 28, and the time.

In the motor retractor 100, the ECU 86 and the driver 82 start to supply a current having a predetermined current value of I0 to the motor 60 to drive the motor 60 at the time point (a time point of T0 in FIG. 3) when it is detected that the tongue plate provided at the webbing 28 has been disconnected from the buckling apparatus (the passenger having released the wearing state of the webbing 28). Thereby, the winding-up of the webbing 28 is started. At the time of driving the motor 60, a rush current IS flows to the motor 60 as shown in FIG. 3, and the motor 60 is rapidly driven, however, at this time point, the passenger's arm, or the like, will not get caught by the webbing 28, and thus no sense of discomfort will be given to the passenger.

Then, when, at a time point of T1 in FIG. 3, for example, the passenger's arm, or the like, gets caught by the webbing 28, resulting in the motor 60 being overloaded, the lock current detection circuit 98 outputs a lock detection signal to the ECU 86, and the ECU 86 outputs, to the driver 82, a signal for interrupting the power feeding to the motor 60. Thereby, the motor 60 is stopped at a time point of T2 in FIG. 3.

Further, when, from the time point of T2 in FIG. 3, a predetermined time (the time necessary for the passenger to release their arm, or the like, from the webbing 28) has elapsed and a time point of T3 in FIG. 3 is reached, the ECU 86 and the driver 82 resume the power feeding to the motor 60, while gradually increasing the magnitude of the current. Thereby, the motor 60 starts the driving, while gradually increasing the driving force and the rotation speed, with the webbing 28 starting to be gradually wound up with a small force. Therefore, even in a case where, within the above-mentioned predetermined time, the passenger has not released their arm, or the like, from the webbing 28, the sense of discomfort given to the passenger can be reduced.

Then, when, at a time point of T4 in FIG. 3, the current value of the supply current to the motor 60 has reached I4, the ECU 86 and the driver 82 terminate the increase in current, supplying a fixed current (a stationary current) with a current value of I4 to the motor 60. In this case, the rush current flowing to the motor 60 at the time point of T4 in FIG. 3 can be reduced, and thus the rush current can be prevented from causing the motor 60 to be rapidly driven, and thus the sense of discomfort given to the passenger can be suppressed. Furthermore, because the magnitude I4 of the stationary current for the motor 60 after the resumption of the power feeding is set such that it is smaller than the magnitude I0 of the stationary current for the motor 60 before the overload detection, the driving force and the rotation speed of the motor 60, that is, the winding-up force and the winding-up speed for the webbing 28, are also decreased. Therefore, the sense of discomfort given to the passenger can be further reduced.

What is claimed is:

1. A motor retractor, comprising:
    a winding shaft which winds up a webbing for restraining a vehicle passenger;
    a motor which rotates the winding shaft in a webbing winding-up direction; and
    a control portion which, after release of the webbing wearing state of the passenger:
        drives the motor to cause the webbing to be wound up around the winding shaft;
        stops the motor when an overload on the motor is detected during the winding-up;
        redrives the motor after a predetermined time having elapsed after the motor is stopped due to detection of the overload, and
        adjusts, at the time of the redriving, a driving state of the motor according to the time of driving the motor that has elapsed before the overload detection,
    wherein, when the time of driving the motor that has elapsed before the overload detection is equal to or longer than a preset time, the control portion lowers the magnitude of a supply current to the motor at the time of the redriving.

2. The motor retractor of claim 1, wherein the control portion adjusts the driving state of the motor a higher current supply magnitude when the time of driving the motor that has elapsed before the overload detection is less than said preset time.

3. The motor retractor of claim 2, wherein said lower and higher current magnitudes are substantially constant.

4. The motor retractor of claim 1, wherein, when the time of driving the motor that has elapsed before the overload detection is equal to or longer than a preset time, the control portion shortens a time of driving the motor at the time of the redriving.

5. The motor retractor of claim 1, wherein, when a preset time has elapsed after the motor is driven for the first time following the release of the webbing wearing state, the control portion lowers the magnitude of a supply current to the motor.

6. A motor retractor comprising:
    a winding shaft which winds up a webbing for restraining a vehicle passenger;
    a motor which rotates the winding shaft in a webbing winding-up direction; and
    a control portion which, after release of a webbing wearing state of the passenger:
        feeds power to the motor to cause the webbing to be wound up around the winding shaft;
        interrupts the power feeding to the motor when an overload on the motor is detected during the winding; and
        gradually increases the magnitude of a current to resume the power feeding to the motor after a predetermined time has elapsed after the interruption of power feeding to the motor,
    wherein the control portion decreases the magnitude of a stationary current for the motor after the resumption of the power feeding to a value that is smaller than the magnitude of the stationary current for the motor before the overload detection.

* * * * *